United States Patent
Lin et al.

(10) Patent No.: US 9,372,893 B2
(45) Date of Patent: Jun. 21, 2016

(54) METHOD AND SYSTEM OF RANKING SEARCH RESULTS, AND METHOD AND SYSTEM OF OPTIMIZING SEARCH RESULT RANKING

(71) Applicant: Alibaba Group Holding Limited, Grand Cayman (KY)

(72) Inventors: Feng Lin, Hangzhou (CN); Jiayu Tang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 315 days.

(21) Appl. No.: 13/945,750

(22) Filed: Jul. 18, 2013

(65) Prior Publication Data

US 2014/0025668 A1    Jan. 23, 2014

(30) Foreign Application Priority Data

Jul. 20, 2012 (CN) .......................... 2012 1 0254425

(51) Int. Cl.
*G06F 17/30* (2006.01)

(52) U.S. Cl.
CPC ...... *G06F 17/3053* (2013.01); *G06F 17/30867* (2013.01)

(58) Field of Classification Search
CPC ....................... G06F 17/3053; G06F 17/30867
USPC .......................................................... 707/748
See application file for complete search history.

(56) References Cited

U.S. PATENT DOCUMENTS

| | | |
|---|---|---|
| 2006/0129533 A1 | 6/2006 | Purvis |
| 2006/0206460 A1 | 9/2006 | Gadkari |
| 2007/0005587 A1 | 1/2007 | Johnson et al. |
| 2007/0043651 A1* | 2/2007 | Xiao et al. ...................... 705/37 |
| 2007/0088690 A1 | 4/2007 | Wiggen et al. |
| 2007/0214131 A1 | 9/2007 | Cucerzan et al. |
| 2008/0016046 A1 | 1/2008 | Guha |
| 2008/0228750 A1 | 9/2008 | Zaragoza |
| 2009/0094235 A1 | 4/2009 | White et al. |
| 2009/0234711 A1* | 9/2009 | Ramer et al. .................... 705/10 |
| 2011/0060733 A1 | 3/2011 | Peng et al. |
| 2011/0184883 A1 | 7/2011 | El-Charif et al. |
| 2011/0252031 A1 | 10/2011 | Blumenthal et al. |
| 2011/0295716 A1 | 12/2011 | Dumon et al. |

OTHER PUBLICATIONS

PCT Search Report and Written Opinion mailed Mar. 28, 2014 for PCT Application No. PCT/US13/51137, 11 Pages.

* cited by examiner

*Primary Examiner* — Thu-Nguyet Le
(74) *Attorney, Agent, or Firm* — Lee & Hayes, PLLC (57) ABSTRACT

The present disclosure provides techniques to rank search results. The techniques may include acquiring a set of primitive characteristics and extracting effective characteristics from the set of primitive characteristics based on historical transaction data. The effective characteristics include characteristics that can have an influence on ranking of search results. The techniques may also include determining an initial weight of each of the effective characteristics based on the historical transaction data, and training the initial weight using the historical transaction data and a predetermined training model to obtain a final weight. Based on the final weight, the search results may be ranked. In some aspects, the techniques may also optimize the ranking to ensure the objectivity and accuracy of ranking results.

18 Claims, 7 Drawing Sheets

METHOD AND SYSTEM OF RANKING SEARCH RESULTS, AND METHOD AND SYSTEM OF OPTIMIZING SEARCH RESULT RANKING

CROSS REFERENCE TO RELATED PATENT APPLICATIONS

This application claims priority to Chinese Patent Application No. 201210254425.6, filed on Jul. 20, 2012, entitled "Method and System of Ranking Search Results, and Method and System of Optimizing Search Result Ranking," which is hereby incorporated by reference in its entirety.

TECHNICAL FIELD

The present disclosure relates to computer data processing, and particularly relates to ranking and optimizing search results.

BACKGROUND

With the development of Electronic Commerce (e-commerce), more and more users purchase items using e-commerce services. In general, an e-commerce website owns tens of millions or even hundreds of millions of items, and thus the users have to search the website to find desired items. A server associated with the website may perform searches based on keywords provided by the users, and return results corresponding to the keywords.

In response to a keyword, the server may produce a larger number of search results. Accordingly, the search results need to be sorted and/or ranked according to a certain order during presentation. The server may take comprehensive consideration into how to rank these search results. For example, search results may be ranked according to a correlation between the search results and a keyword, previous click-through rates, previous deals associated with the search results, and etc. For an e-commerce website, to improve the sales volume of a commodity, the server may also consider deal feasibilies (e.g., deal conversion rates and positive feedback rates of search results).

Currently, a server of an e-commerce website ranks search results based on the correlation and deal feasibility predictions that are generally obtained based on manual analysis on historical data, empirical determination of commodity characteristics and weights of the search results (i.e. a specific commodity), and/or calculations according to a certain formula. Commodity characteristics refer to factors that are capable of affecting the deal feasibility of the commodity (e.g., sale volumes, positive feedback rates, and deal conversion rates). Since determination of characteristics and weights by empirical setting is relatively random and subjective, errors often occur. The returned search results may differ significantly from what the users desired, or ranking of the search results may not satisfy the users. Because the server may only return a certain number of search results, the users may not receive their desired results. To obtain their desired results, the users may modify keywords and re-submit queries. This causes the server to have increased data transmission, which undoubtedly increases the burden on the server and occupies a lot of network resources or even leads to network congestion. Meanwhile, this also indicates that the search results returned by the server have a large amount of irrelevant data, and server resources and network resources are therefore wasted.

SUMMARY

The present disclosure provides a method and system of ranking search results and an optimization method and system of ranking search results. Embodiments of the present disclosure solve the problem of increased burden on a server and of network congestion as described above.

Embodiments of the present disclosure relate to a method of ranking search results. The embodiments include acquiring a set of primitive characteristics. In some embodiments, the primitive characteristics include preset characteristics that may have an influence on ranking of search results. The embodiments may also include extracting effective characteristics from the set of primitive characteristics based on historical transaction data, wherein the effective characteristics refer to characteristics determined based on the historical transaction data that may have an influence on ranking of search results, determining an initial weight of each of the effective characteristics based on the historical transaction data, training the initial weight using the historical transaction data and a predetermined training model to obtain a final weight, and ranking the search results based on the final weight of the effective characteristic.

Further, the extracting effective characteristics from the set of primitive characteristics based on historical transaction data comprises selecting two groups of test products based on historical transaction data, one of which being products with deal records and the other of which being products without deal records, respectively extracting associated data of the two groups of test products within a certain time period from the historical transaction data and calculating a characteristic value of each primitive characteristic of the two groups of test products using the associated data, and comparing characteristic values of the same primitive characteristic of the two groups of test products, and if a difference value thereof exceeds a threshold value, selecting the primitive characteristic as an effective characteristic.

Further, the extracting effective characteristics from the set of primitive characteristics based on historical transaction data comprises extracting transaction data within a predetermined time period from historical transaction data and calculating a deal conversion rate of each product within the predetermined time period, selecting two groups of products with a difference value of deal conversion rates greater than a threshold value as test products, extracting transaction data of the two groups of test products within a certain time period following the predetermined time period from the historical transaction data and calculating a characteristic value of each primitive characteristic in a set of primitive characteristics of the two groups of test products, and comparing characteristic values of the same primitive characteristic of the two groups of test products, and if a difference value thereof exceeds a threshold value, selecting the primitive characteristic as an effective characteristic.

Further, the determining an initial weight of each of the effective characteristics based on the historical transaction data, and training the initial weight using the historical transaction data and a training model to obtain a final weight comprises determining an initial weight of an effective characteristic, substituting the historical transaction data and the initial weight into a predetermined training model to calculate theoretical data, and comparing the theoretical data with actual data, and if a difference there between is within a predetermined range, determining that the initial weight is a final weight of the effective characteristic, if not, returning to the step of determining an initial weight of an effective characteristic.

Further, the ranking the search results based on the final weight of the effective characteristic comprises determining actual effective characteristic values of the search results, calculating predicted deal conversion rates of the search results based on the final weight of the effective characteristic and the actual effective characteristic values, and ranking the search results based on the predicted deal conversion rates.

Embodiments of the present disclosure relate to an optimization method of ranking search results. The embodiments may include respectively acquiring each group of candidate weight values of effective characteristics of search results, calculating theoretical ranking scores of search results at a certain predetermined time point respectively using each of the candidate weight values, and ranking the search results based on the theoretical ranking scores to obtain each group of ranking results, respectively acquiring a predetermined number of search results ranked higher in each group of ranking results, and acquiring transaction data of the search results after the predetermined time point, calculating actual ranking scores of a predetermined number of search results ranked higher in each group of ranking results based on the transaction data, and selecting candidate weight values corresponding to a group of ranking results with the highest actual ranking score as final weight values of the effective characteristics.

Further, the theoretical ranking score is a predicted value of a single characteristic or a predicted value of a combination of characteristics, and the actual ranking score is an actual value of a single characteristic or an actual value of a combination of characteristics that is corresponding to the theoretical ranking score.

Further, the theoretical ranking score is a predicted deal conversion rate and the actual ranking score is an actual deal conversion rate or the theoretical ranking score is a predicted positive feedback rate and the actual ranking score is an actual positive feedback rate.

Further, the selecting candidate weight values corresponding to a group of ranking results with the highest actual ranking score as final weight values of the effective characteristics comprises selecting candidate weight values corresponding to a group of ranking results with the highest sum or average value of actual ranking scores as final weight values of the effective characteristics.

Embodiments of the present disclosure relate to an optimization method of ranking search results. The embodiments may include acquiring ranking results at a certain predetermined time point ranked based on theoretical ranking scores of search results, wherein the theoretical ranking score is obtained based on a final weight of an effective characteristic and an actual effective characteristic value of each of the search results, acquiring transaction data of a predetermined number of search results ranked higher in the ranking results after the predetermined time point and calculating actual ranking scores of the search results based on the transaction data, and comparing the actual ranking score with the theoretical ranking score, and if a difference value thereof exceeds a threshold value, optimizing the final weight of the effective characteristic.

Further, the theoretical ranking score is a predicted deal conversion rate and the actual ranking score is an actual deal conversion rate, or the theoretical ranking score is a predicted positive feedback rate and the actual ranking score is an actual positive feedback rate.

Embodiments of the present disclosure further relate to a system of ranking search results. The embodiments may include a primitive characteristic set acquisition module for acquiring a set of primitive characteristics, wherein the primitive characteristics include preset characteristics that may have an influence on ranking of search results, an effective characteristic extraction module for extracting effective characteristics from the set of primitive characteristics based on historical transaction data, wherein the effective characteristics refer to characteristics determined based on the historical transaction data that may have an influence on ranking of search results, an effective characteristic weight determination module for determining an initial weight of each of the effective characteristics based on the historical transaction data, and training the initial weight using the historical transaction data and a predetermined training model to obtain a final weight, and a ranking module for ranking the search results based on the final weight of the effective characteristic.

Further, the effective characteristic extraction module comprises a test product selection sub-module for selecting two groups of test products based on historical transaction data, one of which being products with deal records and the other of which being products without deal records, a characteristic value calculation sub-module for respectively extracting associated data of the two groups of test products within a certain time period from the historical transaction data and calculating a characteristic value of each primitive characteristic of the two groups of test products using the associated data, and a comparison sub-module for comparing characteristic values of the same primitive characteristic of the two groups of test products, and if a difference value thereof exceeds a threshold value, selecting the primitive characteristic as an effective characteristic.

Embodiments of the present disclosure relate to an optimization system of ranking search results. The embodiments may include a candidate weight value acquisition module for respectively acquiring each group of candidate weight values of effective characteristics of search results, a theoretical ranking score calculation module for calculating theoretical ranking scores of search results at a certain predetermined time point respectively using each of the candidate weight values, and ranking the search results based on the theoretical ranking scores to obtain each group of ranking results, a transaction data acquisition module for respectively acquiring a predetermined number of search results ranked higher in each group of ranking results, and acquiring transaction data of the search results after the predetermined time point, an actual ranking score calculation module for calculating actual ranking scores of a predetermined number of search results ranked higher in each group of ranking results based on the transaction data, and a final weight determination module for selecting candidate weight values corresponding to a group of ranking results with the highest actual ranking score as final weight values of the effective characteristics.

Embodiments of the present disclosure relate to an optimization system of ranking search results. Embodiments may include a theoretical ranking score calculation module for acquiring ranking results at a certain predetermined time point ranked based on theoretical ranking scores of search results, wherein the theoretical ranking score is obtained based on a final weight of an effective characteristic and an actual effective characteristic value of each of the search results, an actual ranking score calculation module for acquiring transaction data of a predetermined number of search results ranked higher in the ranking results after the predetermined time point and calculating actual ranking scores of the search results based on the transaction data, and an optimization module for comparing the actual ranking score with the theoretical ranking score, and if a difference value thereof exceeds a threshold value, optimizing the final weight of the effective characteristic.

Embodiments of the present disclosure include advantages over the prior art. Embodiments of the present disclosure select effective characteristics that affect ranking results through historical transaction data, determine final weights of the effective characteristics in combination with the historical transaction data, and finally rank search results using these weights. In this process, besides that an initial weight of each of the effective characteristics will be determined based on the historical transaction data, the initial weight also will be trained using the historical transaction data, thereby obtaining an optimized final weight to ensure the objectivity and accuracy of the final weight, thereby improving the objectivity and accuracy of ranking results to prevent a user from continuously requesting to acquire the remaining data or resending a new search request to a server via a client side due to the fact that the user cannot obtain the expected search results caused by inaccurate ranking, thereby reducing the burden on the server and the occupation of network resources as well as the transmission quantity of data.

In addition, when effective characteristics are selected, first, two groups of test products with high and low deal rates as well as a higher contrast are selected as a test basis based on historical transaction data. After characteristic values of the two groups of test products are respectively calculated based on the historical transaction data, the two groups of products are compared for a difference between characteristic values of the same primitive characteristic to determine the influence of characteristics on the product deal rate, thereby accurately selecting effective characteristics and improving the accuracy of ranking.

In the optimization method and system of ranking search results of the present disclosure, the optimum weight value is determined or the determined weight value is optimized by use of transaction data at a certain time point and after the time point, i.e. a relatively optimized manner of ranking search results is determined or the existing manner of ranking search results is optimized by use of real historical transaction data, which allows ranking results to be more objective and accurate, and also may prevent a user from continuously requesting to acquire the remaining data or resending a new search request to a server via a client side due to the fact that the user cannot obtain the expected search results caused by inaccurate ranking, thereby reducing the burden on the server and the occupation of network resources as well as the transmission quantity of data. Embodiments of the present disclosure may not be implemented to meet all the above advantages at the same time.

Furthermore, embodiments of the present disclosure may pre-process the information of pages and the query phrase by deleting invalid characters, and/or word roots. Embodiments of the present disclosure may speed up searches, determine the sorting processes, and return accurate and relevant results.

BRIEF DESCRIPTION OF THE DRAWINGS

The Detailed Description is described with reference to the accompanying figures. The use of the same reference numbers in different figures indicates similar or identical items.

DETAILED DESCRIPTION

Embodiments of the present disclosure are further described below in detail with reference to the drawings.

Figure 1:
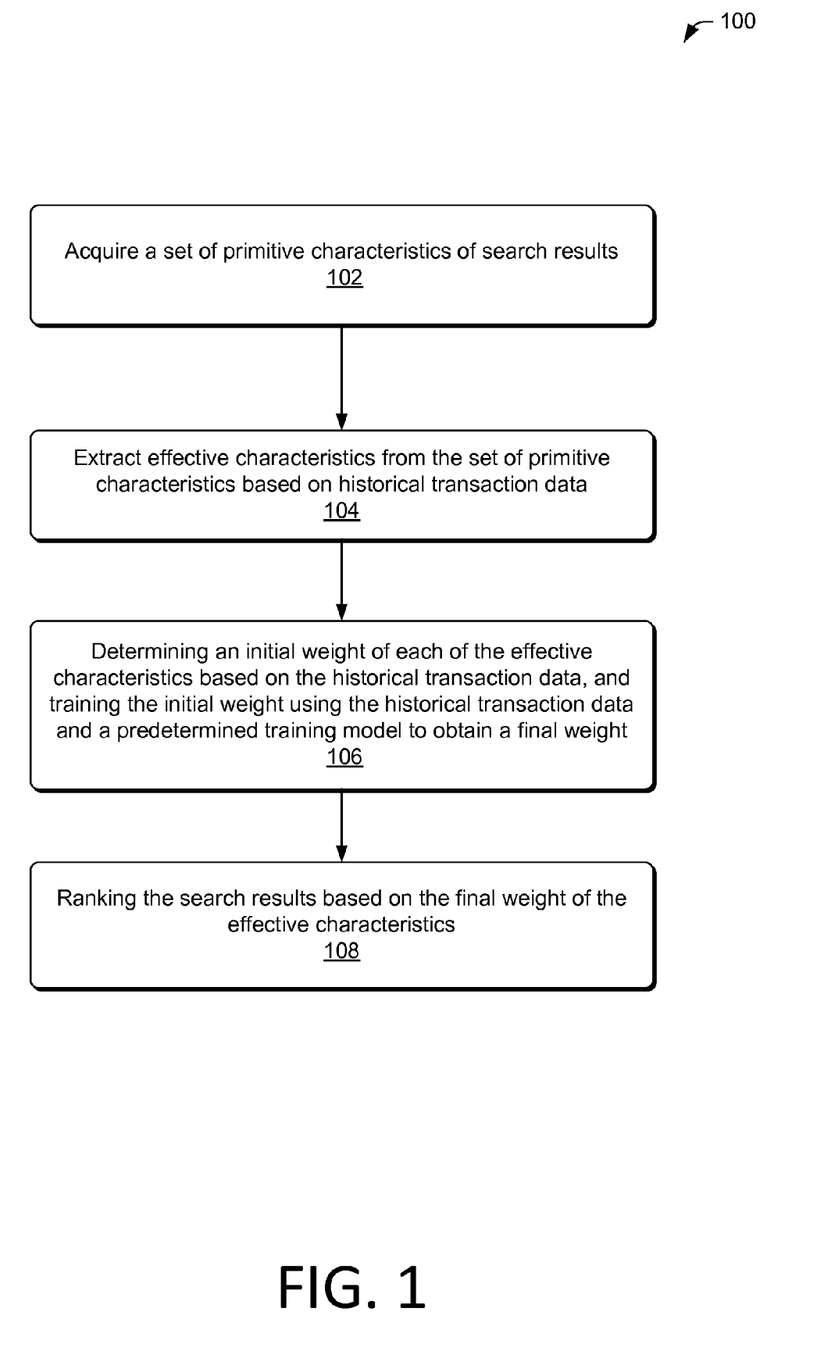
FIG. 1 is a flow chart of an illustrative process for ranking search results.

FIG. 1 is a flow chart of an illustrative process for ranking search results. At 102, a server may acquire a set of primitive characteristics, wherein the primitive characteristics include preset characteristics that may have an influence on ranking of search results. The set of primitive characteristics may be determined based on historical transaction data or empirically. In some embodiments, the characteristics may include a set of primitive characteristics trading volume, deal conversion rate, positive feedback rate, delivery speed, picture-word quality, transaction amount, etc.

In some embodiments, the set of primitive characteristics of search results may be preset, and may be directly acquired from a server or other databases when required, and historical transaction data also may be acquired in real time from a server or database and extracted by real-time analysis.

At 104, the server may extract effective characteristics from the set of primitive characteristics based on historical transaction data. In some embodiments, the effective characteristics may include characteristics that are determined based on the historical transaction data that may have an influence on ranking of search results.

In some embodiments, the historical transaction data may be directly read from a server. In these instances, the extracting effective characteristics from the set of primitive characteristics based on historical transaction data specifically may include selecting two groups of test products based on historical transaction data, one of which being products with deal records and the other of which being products without deal records, respectively extracting associated data of the two groups of test products within a certain time period from the historical transaction data and calculating a characteristic value of each primitive characteristic of the two groups of test products using the associated data, and comparing characteristic values of the same primitive characteristic of the two groups of test products, and if a difference value thereof exceeds a threshold value, selecting the primitive characteristic as an effective characteristic.

In some embodiments, the associated data may be used to calculate specific values of various characteristics in a set of primitive characteristics. Different characteristics need different associated data, and specific associated data may be determined according to specific needs. For example, for this characteristic-trading volume, its required data is the number of deals within a predetermined time period, so its associated data is the number of deals. For another example, for positive feedback rate, its required raw data includes the total number of feedbacks and the number of positive feedbacks within a predetermined time period, so its associated data includes the total number of feedbacks and the number of positive feedbacks.

In some embodiments, the calculation formula of a characteristic value of each primitive characteristic in a set of primitive characteristics may be determined according to the practical situation. In some instances, how to effectively represent the characteristic may be considered. For example, for this characteristic-trading volume, if its characteristic value is directly represented by the value of trading volume, then its theoretical value may be from 0 to any natural number. In some instances, when a specific value is obtained, the problem often cannot be explained by just comparing the difference among values.

For example, trading volumes are 0 and 1 respectively. In these instances, although the difference between characteristic values of both trading volume is 1, the difference indicates whether there is a transaction. For another example, trading volumes are 100 and 101 respectively. Although the difference is still 1, the difference indicates one transaction between the trading volumes. Accordingly, a calculation formula may be reset for the characteristic. For example, a final characteristic value may be calculated by taking the trading volume as a parameter instead of a characteristic value.

For example, suppose that the trading volume is n, then equation $1-1/(1+n)$ may be employed to calculate the characteristic value. Correspondingly, if the trading volumes are 0 and 1 respectively, the characteristic values are 0 and 0.5 respectively. While characteristic values of 100 transactions and 101 transactions are 0.9901 and 0.9902 respectively. In this way, changes of trading volumes may be more effectively represented.

It may be understood that a criterion for selecting two groups of test products in the above-mentioned step is whether there are deal records. In some embodiments, in order to improve a contrast of two groups of test products, increase a range of selected products and improve accuracy of results, one group may be products with deal records higher than a first threshold value, while the other group is products without deal records or with deal records lower than a second threshold value. In these instances, the first threshold value and the second threshold value may be set according to the practical situation. The first threshold value may be set as high as possible, while the second threshold value may be set as low as possible. This may ensure that two groups of test products have larger differences, thus facilitating subsequent accurate extraction of effective characteristics.

It may be understood that test products may be selected based on some characteristics in addition to the historical transaction data (e.g., deal records). According to some embodiments of the present disclosure, search results are ranked in an e-commerce website and search results that are expected by a user are provided. This increases the probability of product purchase and prevents the user from repeatedly sending a search query to a server. Embodiments of the present disclosure include a deal conversion rate of a product in addition to correlations. The deal conversion rate of a product may be a probability that a certain product is purchased after appearing in search results. In some embodiments, this characteristic (e.g., the deal conversion rate of a product) may have a greater weight on ranking results. In some embodiments, a user submits a query and receives search results including a product. The greater probability the user purchases the product, the greater probability other users who submit the same or similar query purchase the same product.

In some embodiments, test products may be selected based on deal conversion rates. The server may extract transaction data within a predetermined time period from historical transaction data and calculate a deal conversion rate of each product within the predetermined time period. The server may then select two groups of products with a difference value of deal conversion rates greater than a threshold value as test products. The server may extract transaction data of the two groups of test products within a certain time period following the predetermined time period from the historical transaction data and calculate a characteristic value of each primitive characteristic in a set of primitive characteristics of the two groups of test products. The server may compare characteristic values of the same primitive characteristic of the two groups of test products. In response to a determination that a difference value thereof exceeds a threshold value, the server may select the primitive characteristic as an effective characteristic.

A predetermined time period may be set according to actual needs. In some instances, to save the calculation time and reduce the calculation amount, a shorter period may be set. In other instances, considering accuracy and capacity of the server, a longer period may be set. For example, 1 day, 3 days, 10 days, 30 days or other periods may set. A certain time period following the predetermined time period also may be set according to actual needs. In some instances, in order to ensure the matching of calculated results, the certain time period may be set based on the predetermined time period. For example, the certain time period may be set as the same as the predetermined time period.

In some embodiments, the server may select two groups of products with a greater difference value of deal conversion rates. The two groups may be selected as test products based on deal conversion rates within a predetermined time period. In some instances, a difference value of a first conversion value and a second conversion value may be set to a threshold value. If the deal conversion rate of a group of products is higher than the first conversion value but lower than the second conversion value, the two groups of products may be selected as test products. The server may then calculate a characteristic value of each primitive characteristic in a set of primitive characteristics of the two groups of test products. The characteristic value may be calculated using transaction data of the two groups of test products within a certain time period following the predetermined time period. If characteristic values of the same primitive characteristic of two groups of test products have a greater difference value, the primitive characteristic may serve as an effective characteristic. For example, the difference value exceeds a set threshold value. Accordingly, two groups of test products with a significant difference of deal conversion rates are selected. The greater the difference value of characteristic values of a certain primitive characteristic indicates that the influence of the primitive characteristic on whether deals are reached on products is greater. Primitive characteristics may be screened in this way to extract related effective characteristics, thus allowing ranking results to be more accurate.

The selection of effective characteristics by the above-mentioned several methods may depend on two groups of test products with a higher deal contrast. For example, one group is products with deal records, while the other group is products without deal records. For another example, one group is products with a higher deal conversion rate, while the other group is products with a lower deal conversion rate. If a certain characteristic has a greater influence on deals of a product, the characteristic values calculated based on transaction data also will have a larger difference. If a certain characteristic has little or almost no influence on deals of a product, the characteristic values of two groups of products with a higher deal contrast also will have little or almost no difference. Consequently, effective characteristics may be better screened by this method, thus improving the ranking accuracy of subsequent search results.

It may be understood that test products also may be selected based on other characteristics. For example, if ranking results depend more on positive feedback degree, two groups of products with a larger difference of positive feedback degree may be selected as test products. Then, characteristic values of primitive characteristics of two groups of test products are calculated in a similar way as mentioned above to extract primitive characteristics with a larger difference of characteristic values as effective characteristics. Similarly, if ranking results depend more on trading volumes, two groups of products with a larger difference of trading volumes may be selected as test products. Certain selections may be performed in a similar process as described above, which is not described in detail here.

At 106, the server may determine an initial weight of each of the effective characteristics based on the historical transaction data, and training the initial weight using the historical transaction data and a predetermined training model to obtain a final weight. In some embodiments, both initial weights and final weights of various effective characteristics may be determined by means of model training. It may be understood that initial weights also may be empirically set. Take a multidimensional linear model for example, initial weights of various effective characteristics first may be determined by means of multidimensional linear fitting. These initial weights may then be substituted into a calculation formula and combined with historical transaction data to calculate theoretical data. The theoretical data may be compared with actual data. The smaller the difference, the more accurately the initial weights are determined. If the difference is within a predetermined range, the initial weights may be selected as final weights of effective characteristics. If the difference is not within a predetermined range, initial weights may be re-determined and calculated by the foregoing method until the difference is reduced to be within a predetermined range.

Take deals of a product for example, first, theoretical deals may be calculated based on initial weights and historical transaction data. Then, the calculated theoretical deals may be compared with actual deals. The smaller the difference, the more accurately the initial weights are determined. The initial weights may serve as final weights of effective characteristics. In some embodiments, weights may be re-determined until the determined weight values allow a difference between the theoretical deals and the actual deals to be minimized or within a predetermined range. In a particular training, deals may be represented by deal conversion rates or indicators whether the deals occur. It may be understood that model trainings may be performed by multiple machine learning methods, which will not be expounded in the present disclosure.

At 108, the server may rank the search results based on the final weight of the effective characteristic. In some embodiments, the ranking the search results based on the final weight of the effective characteristic comprises determining actual effective characteristic values of the search results, calculating predicted deal conversion rates of the search results based on the final weight of the effective characteristic and the actual effective characteristic values, and ranking the search results based on the predicted deal conversion rates.

In some embodiments, ranking may be performed based on other factors. These factors may include positive feedback rate of search results, and other factors that may be determined according to different ranking purposes. When ranking purposes are different, the factors for ranking may be different. Therefore, ranking results may change correspondingly. Then, ranking scores of various search results may be calculated and the search results may be ranked based on the foregoing method.

The foregoing method will be described below in detail with reference to particular examples. Suppose that the five characteristics included in a set of extracted primitive characteristics are a trading volume, deal conversion rate, positive feedback rate, delivery speed and picture-word quality.

Suppose that a predetermined time period is 30 days. As illustrated in Table 1, it may be determined that the historical transaction data to be acquired comprises the number of deals, number of exposures, number of positive feedbacks, total number of feedbacks, days of delivery, the number of pictures and number of words. After these historical transaction data are acquired, calculation may be performed according to a calculation method to determine a characteristic value of each primitive characteristic.

TABLE 1

Calculation method of characteristic values and raw data

| SN | Raw data | Name of characteristics | Calculation method |
|----|----------|------------------------|--------------------|
| 1 | Number of deals (n) within 30 days | Trading volume | $1 - 1/(1 + n)$ |
| 2 | Number of deals (n) within 30 days and number of exposures (d) within 30 days | Deal conversion rate | $(n + 0.2)/(d + 10)$ |
| 3 | Number of positive feedbacks (g) within 30 days and total number of feedbacks (f) within 30 days | Positive feedback rate | $(g + 8.5)/(f + 10)$ |
| 4 | Days of delivery (t) | Delivery speed | if(t > 3) 3/t; else 1; |
| 5 | Number of pictures (i) and number of words (w) | Picture-word quality | $(1 - 1/(1 + i))*(1 - 1/(1 + w))$ |

Suppose that characteristic values of the five characteristics of the two groups of test products calculated based on the above historical transaction data are initial characteristic values. Two groups of test products with a higher contrast may be selected based on the calculated initial characteristic values. Suppose further that one group is products with a deal conversion rate of more than 70% while the other group is products with a deal conversion rate of lower than 1%. It may be understood that, if test products are selected herein dependent upon deal conversion rate, only the deal conversion rate may be calculated and characteristic values of other characteristics may not be calculated.

The historical transaction data of the two groups of test products within several time periods following the above 30 days may be acquired. For example, it may be historical transaction data within a week and also may be historical transaction data still within 30 days, and characteristic values of the five characteristics of the two groups of test products may be calculated based on these historical transaction data and assumed to be validated characteristic values.

Then, the validated characteristic values of the same characteristic of the two groups of test products may be respectively compared. If a difference value thereof exceeds a threshold value, the characteristic may be determined as an effective characteristic. Suppose further that the threshold value is 0.3, the above comparison indicates that the five characteristics of the two groups of test products. The trading volume, deal conversion rate, positive feedback rate, delivery speed and picture-word quality have a difference value of 0.6, 0.9, 0.8, 0.5 and 0.02 respectively. Accordingly, it follows that the finally selected effective characteristics are trading volume, deal conversion rate, positive feedback rate and delivery speed.

The final weights of the four effective characteristics may be determined by means of model training based on historical transaction data, and actual values of the four effective characteristics in search results may be acquired. Then, ranking scores of various search results may be calculated based on the determined final weights and actual values of the effective characteristics. Accordingly, the search results are ranked based on the ranking scores.

Embodiments of the present disclosure select effective characteristics that affect ranking results through historical transaction data, determine final weights of the effective characteristics in combination with the historical transaction data, and finally rank search results using these weights. In this process, an initial weight of each of the effective characteristics may be determined based on the historical transaction data. Then, the initial weight may be trained using the historical transaction data. This obtains an optimized final weight to ensure the objectivity and accuracy of the final weight, and improves the objectivity and accuracy of ranking results.

In addition, when effective characteristics are selected, first, two groups of test products with high and low deal rates may be selected, and a higher contrast may be also selected as a test basis based on historical transaction data. After characteristic values of the two groups of test products are respectively calculated based on the historical transaction data, the two groups of products may be compared for a difference between characteristic values of the same primitive characteristic to determine the influence of characteristics on the product deal rate, thereby accurately selecting effective characteristics and improving the ranking accuracy.

Figure 2:
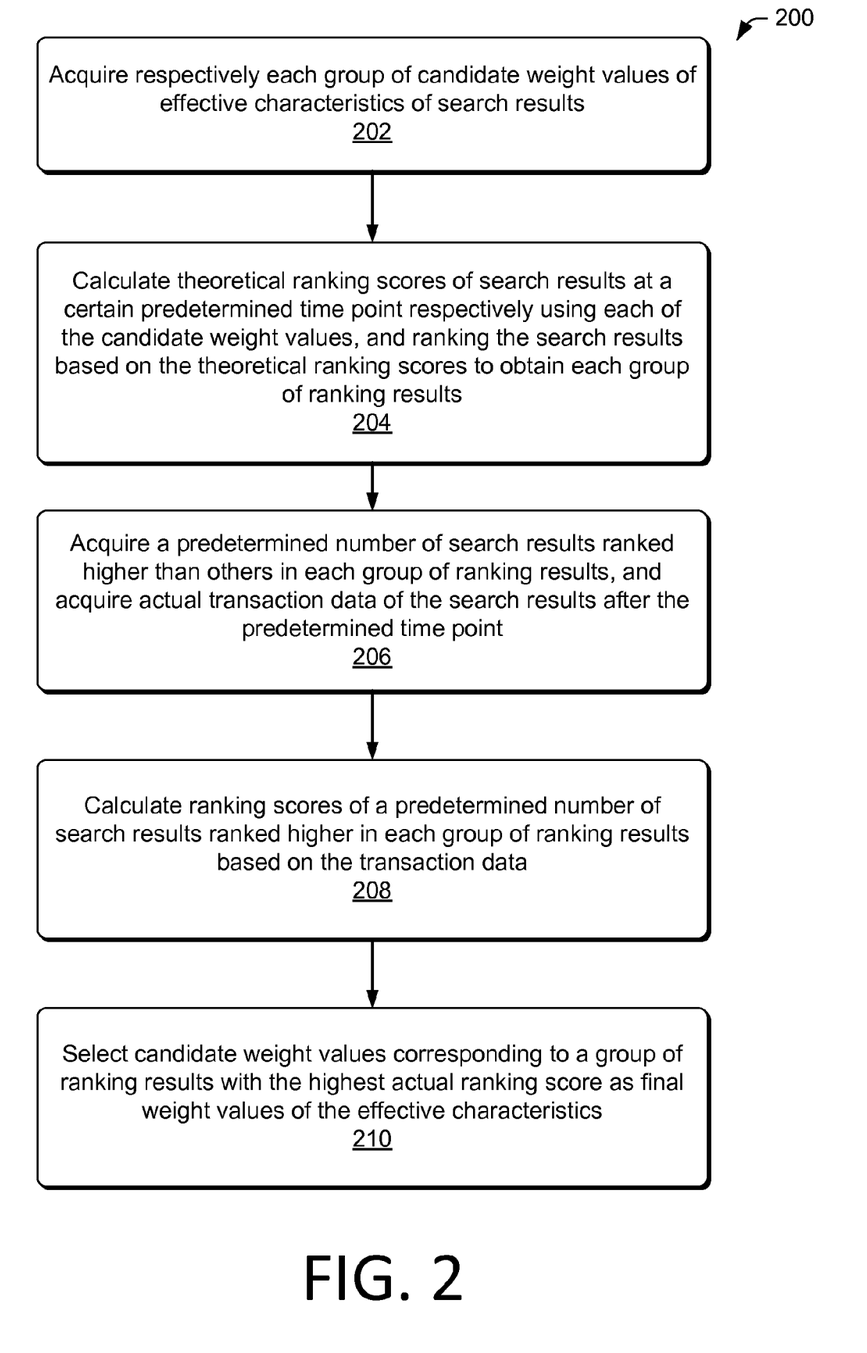
FIG. 2 is a flow chart of an illustrative process for optimizing search results.

FIG. 2 is a flow chart of an illustrative process for optimizing search results. At 202, the server may respectively acquire each group of candidate weight values of effective characteristics of search results. There are at least two groups of candidate weight values of effective characteristics and there also may be three or four groups thereof.

At 204, the server may calculate theoretical ranking scores of search results at a certain predetermined time point respectively using each of the candidate weight values, and ranking the search results based on the theoretical ranking scores to obtain each group of ranking results. Theoretical ranking scores may be specific scores of deal conversion rates, predicted positive feedback rates or other characteristics or a combination of characteristics of search results, which are determined based on actual ranking purposes and not limited in the present disclosure.

In some embodiments, the theoretical ranking scores are illustrated by taking predicted deal conversion rates as an example in an embodiment of the present disclosure. The server may calculate predicted deal conversion rates of search results at a certain predetermined time point respectively using each of the candidate weight values, and ranking the search results based on the predicted deal conversion rates to obtain each group of ranking results.

When search results at a certain predetermined time point are determined, effective characteristics of the search results may be acquired first, and effective characteristic values of these search results may be calculated based on actual data. Different predicted deal conversion rates of the search results may be calculated based on effective characteristic values respectively in combination with each group of candidate weight values, and different ranking results may be obtained based on the different predicted deal conversion rates.

For example, suppose that there are in total four search results at a certain predetermined time point including: a, b, c and d. Suppose further that there are two groups of candidate weight values. There is a possibility that the ranking results calculated based on one group of weight values are: a, b, c and d, while the ranking results calculated based on the other group of weight values are: d, c, a and b.

At 206, the server may respectively acquire a predetermined number of search results ranked higher in each group of ranking results, and acquire transaction data of the search results after the predetermined time point. A predetermined number of specific values ranked higher may be determined based on the number of actual search results and the calculation capability of a system. For example, if the number of actual search results is bigger than a predetermined value while the calculation capability of a system is less than one predetermined value. The predetermined number may be set to a smaller value, e.g. 2%, 4%, etc. If allowed by the calculation capability of a system, a predetermined number may be set to a larger value, e.g. 10%, etc. Of course, the more the data is, the more objective and accurate results may be provided. Thus, multiple predetermined numbers also may be set, e.g. 2%, 4%, 6%, 8%, 10%, etc.

The specific range of transaction data after a predetermined time point may be set according to a particular condition. For example, the range may cover transaction data within one week after a predetermined time point and also may cover transaction data within ten days, twenty days or other time periods, provided that the transaction data is that capable of being acquired after a predetermined time point.

At 208, the server may calculate actual ranking scores of a predetermined number of search results ranked higher in each group of ranking results based on the transaction data. In some embodiments, the actual ranking scores may be those of search results calculated based on actual data using the same method as that for calculating theoretical ranking scores. For example, where theoretical ranking scores are predicted deal conversion rates, actual ranking scores herein may include actual deal conversion rates.

At 210, the sever may select candidate weight values corresponding to a group of ranking results with the highest actual ranking score as final weight values of the effective characteristics.

In some embodiments, theoretical ranking scores of various search results may be calculated during ranking. Accordingly, the higher the theoretical ranking scores, the more frontward the ranking order. The higher the actual ranking scores is, the more conformable the ranking results to the practical situation is indicated to the user and ranking herein is more accurate. It may be understood that the highest actual ranking scores may mean that actual ranking scores of search results selected from a certain ranking result are higher than those of search results at the same position in other ranking results. However, this is a relatively ideal ranking result and such an optimized ranking result may not be obtained in some embodiments, thus the highest actual ranking scores may refer to the highest sum or the average value of actual ranking scores so as to simplify the calculation flow.

Take the foregoing two ranking results a, b, c and d, as well as d, c, a and b for example. Suppose that the basis of ranking is deal conversion rates. As results, search results may be ranked based on values of predicted deal conversion rates, and then the search results ranked at the first two positions may be selected from each group of ranking results, which are respectively a and b, and d and c. Actual deal conversion rates of the four search results (a, b, c and d) may be calculated based on transaction data, which are respectively 5%, 4%, 3% and 2%. Then it follows that the average value of actual deal conversion rates of a and b is 4.5%, which is higher than the average value 2.5% of actual deal conversion rates of d and c. Accordingly, candidate weight values corresponding to the group of ranking results a, b, c and d may be taken as final weight values of effective characteristics.

The foregoing embodiments related to optimizing search results are described below in detail by taking deal conversion rates as an example in combination with particular examples.

Figure 3:
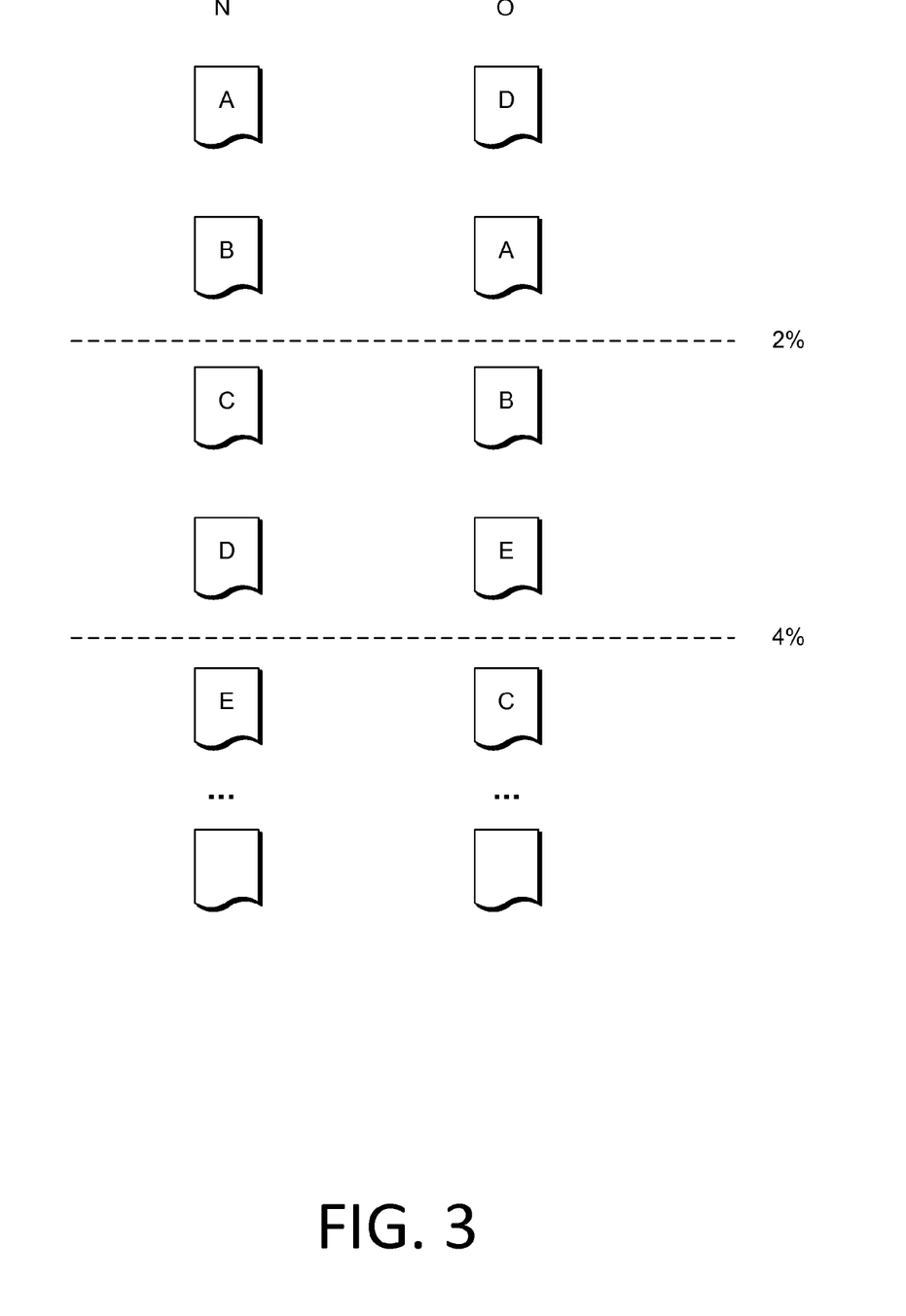
FIG. 3 is a schematic diagram of exemplary groups showing ranking and optimizing search results.

Suppose that a group of search results may be obtained by searching a keyword at a time point T. According to the foregoing embodiments, effective characteristics of the group of search results may be constant and effective characteristic values thereof may also be constant. Suppose that effective characteristics have two groups of final weights. As a result, predicted deal conversion rates of search results may be calculated based on the two groups of final weight values, and then search results may be ranked based on the values of predicted deal conversion rates. Suppose that there are 50 search results, and two groups of ranking results may be obtained as a result of difference among weight values. The two groups of ranking results are supposed to be N and O (as shown in FIG. 3), for which, the average value of actual deal conversion rates of the first x % of search results may be calculated within a time period after T (e.g. within one week). The fact that the average value of actual deal conversion rates of the first x % of ranking result N is higher than that of actual deal conversion rates of the first x % of ranking result O indicates that deal conversion rates of ranking results predicted via a ranking result N at the time point T are closer to actual results. That is, if returned to the time point T, weight values employed by the ranking result N may be applied to rank search results, and thus may rank higher the search results with higher deal conversion rates after the time point T, thereby increasing the presentation opportunity of these search results and promoting more transactions.

In some embodiments, the difference between two groups of ranking results may be calculated by selecting different x values to obtain more comprehensive and objective comparison. For example, the average value of actual deal conversion rates of the first 2% of a commodity is calculated; then that of the first 4%, 6%, 8% ... is calculated (as shown in Table 2). The two ranking results then may be compared at different points. It follows that the predictive effect of the ranking result N is significantly better than that of the ranking result O. It may be understood that the data may further be plotted as a curve of the average value of actual deal conversion rates to more visually observe the effect difference there between.

TABLE 2

The average value of actual deal conversion rates of the first x % of commodity for two ranking results (N and O)

| x % | 2% | 4% | 6% | 8% | 10% | ... |
|---|---|---|---|---|---|---|
| N | 0.038671 | 0.037019 | 0.036061 | 0.035228 | 0.034294 | ... |
| O | 0.031106 | 0.030587 | 0.029903 | 0.029179 | 0.028548 | ... |

In some embodiments, significance validation may also be further performed to ensure that the final weights of effective characteristics employed by the ranking result N have statistical other than occasional significance over those employed by the ranking result O in terms of effect improvement. Significance validation may be achieved through many prior methods, e.g. take T-test as an example. T-test may be performed to compare the average value of two groups of samples. A P value in T-test represents a probability that that there is a difference between the average values of two samples is false. It is generally believed that the difference between two samples is very significant when P<=0.01. Suppose that there are 50 average values of actual deal conversion rates. As results, T-test may be applied to the 50 average values of actual deal conversion rates of two ranking results in Table 1, and the P value obtained is about 8.7E-07, which is far smaller than 0.01. Accordingly, in the case of statistical significance, the final weights of effective characteristics employed by the ranking result N may be optimized more significantly than those employed by the ranking result O.

It may be understood that deal conversion rates are used as an example for illustration in the foregoing method, although ranking and optimization may be performed based on other characteristics (e.g., positive feedback rate, delivery speeds, and etc.). In some embodiments, ranking and optimization may also be performed based on comprehensive characteristics.

In some embodiments, final weights of the effective characteristics have not yet been determined, and final weights of a group of optimum effective characteristics need to be selected from multiple groups of possible results. It may be understood that some embodiments may be implemented when the optimization may be performed based on the fact that final weights of the effective characteristics have been determined.

Figure 4:
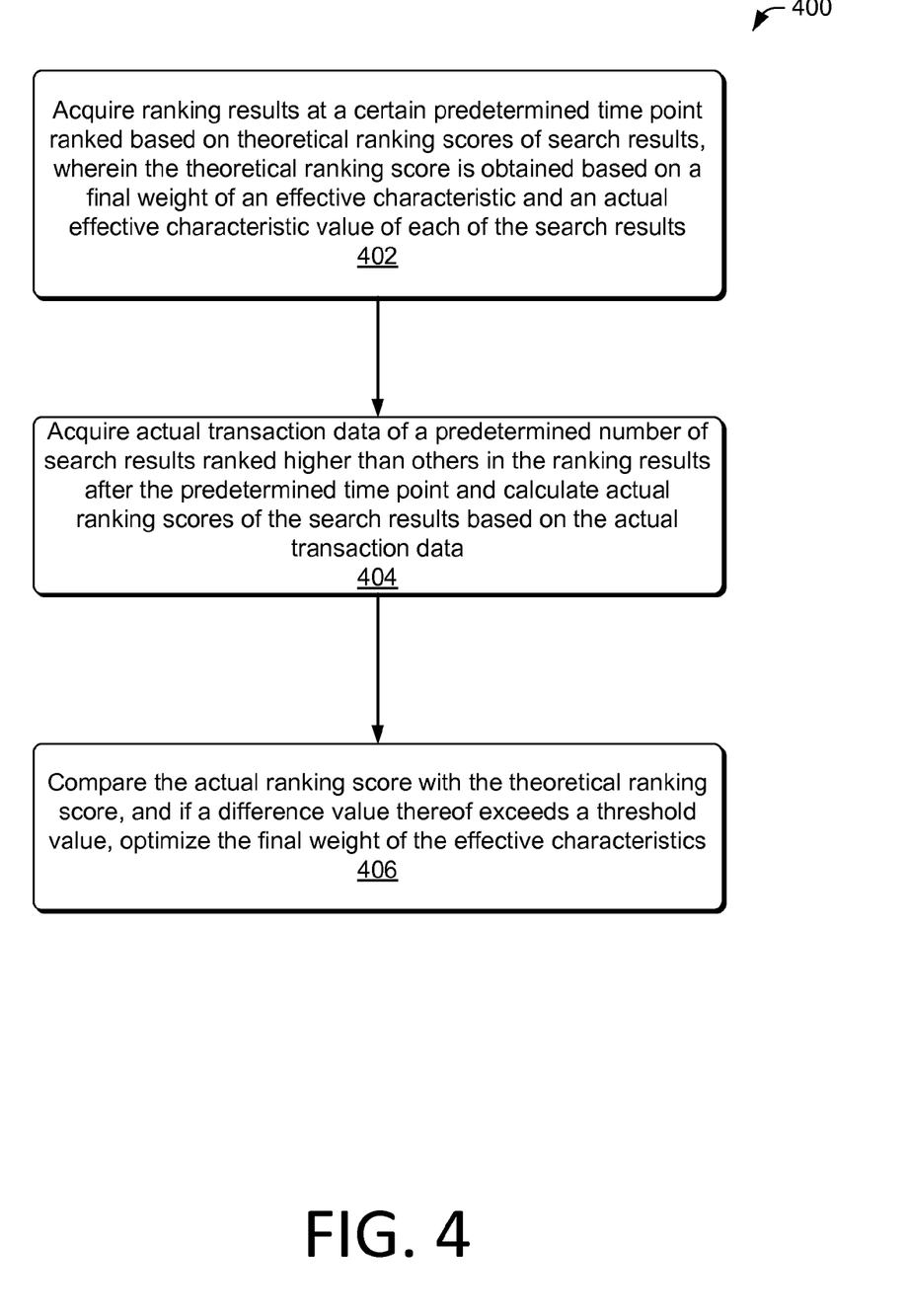
FIG. 4 is a flow chart of an illustrative process for optimizing search results.

FIG. 4 is a flow chart of an illustrative process for optimizing search results. At 402, the server may acquire ranking results at a certain predetermined time point ranked based on theoretical ranking scores of search results, wherein the theoretical ranking score is obtained based on a final weight of an effective characteristic and an actual effective characteristic value of each of the search results.

At 404, the server may acquire transaction data of a predetermined number of search results ranked higher in the ranking results after the predetermined time point and calculating actual ranking scores of the search results based on the transaction data.

At 406, the server may compare the actual ranking score with the theoretical ranking score, and if a difference value thereof exceeds a threshold value, optimizing the final weight of the effective characteristic.

A final weight of an effective characteristic may be optimized by means of model training mentioned in the above ranking method. In some instances, a final weight of each effective characteristic may be determined and optimized by acquiring historical transaction data in combination with a training model, which may not be described in detail herein. A threshold value also may be set based on actual characteristics corresponding to an actual ranking score and a theoretical ranking score. For example, if the actual ranking score and the theoretical ranking score are respectively an actual deal conversion rate and a predicted deal conversion rate, their threshold values may be determined by the allowable difference value range of the deal conversion rates in general case (e.g., 0.2 or other values).

In some embodiments, the optimum weight value may be determined by use of transaction data at a certain time point and after the time point. In some embodiments, the determined weight value may be optimized by use of transaction data at a certain time point and after the time point. In some instances, a relatively optimized manner of ranking search results may be determined by use of real historical transaction data, which allows ranking results to be more objective and accurate. In some instances, the existing manner of ranking search results may be optimized by use of real historical transaction data.

Figure 5:
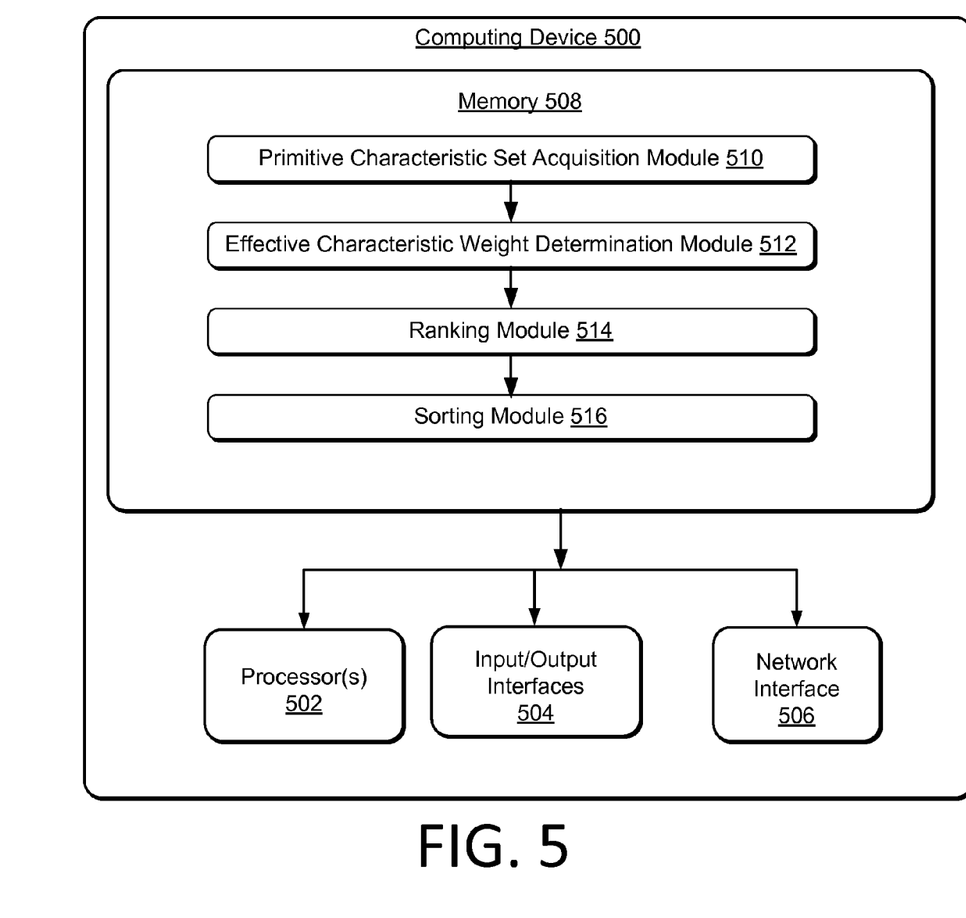
FIGS. 5-7 are schematic diagrams of illustrative computing architectures that enable ranking and optimizing search result.
Figure 6:
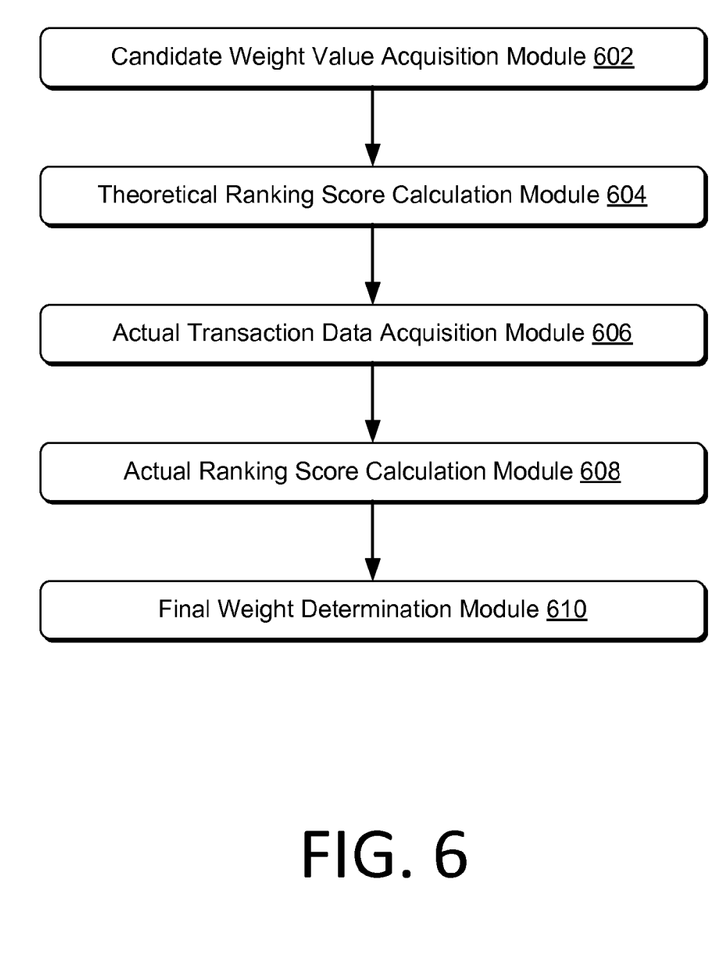
Figure 7:
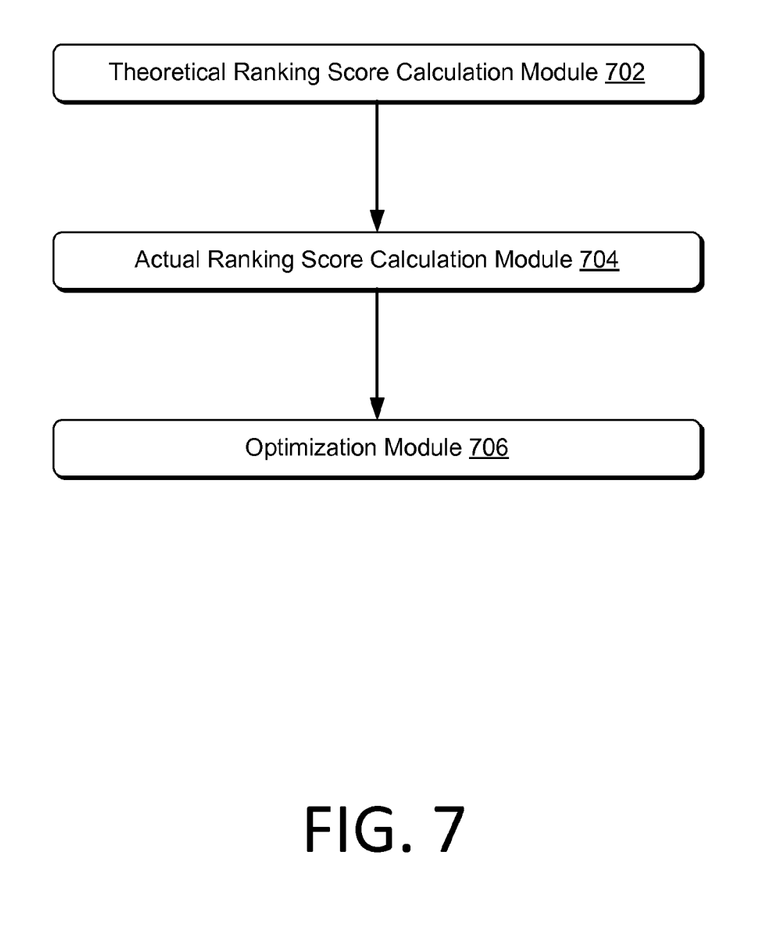

FIGS. 5-7 are schematic diagrams of illustrative computing architectures that enable ranking and optimizing search result. FIG. 5 is a diagram of a computing device 500. The computing device 500 may be a user device or a server for a multiple location login control. In one exemplary configuration, the computing device 500 includes one or more processors 502, input/output interfaces 504, network interface 506, and memory 508.

The memory 508 may include computer-readable media in the form of volatile memory, such as random-access memory (RAM) and/or non-volatile memory, such as read only memory (ROM) or flash RAM. The memory 408 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 508 in more detail, the memory 508 may include a primitive characteristic set acquisition module 510, an effective characteristic extraction module 512, an effective characteristic weight determination module 514 and a ranking module 516.

The primitive characteristic set acquisition module 510 is configured to acquire a set of primitive characteristics, wherein the primitive characteristics include preset characteristics that may have an influence on ranking of search results. The effective characteristic extraction module 512 is configured to extract effective characteristics from the set of primitive characteristics based on historical transaction data, wherein the effective characteristics refer to characteristics determined based on the historical transaction data that may have an influence on ranking of search results. In some embodiments, the effective characteristic extraction module comprises a test product selection sub-module, a characteristic value calculation sub-module and a comparison sub-module. The test product selection sub-module is configured to select two groups of test products based on historical transaction data, one of which is products with deal records and the other of which is products without deal records. The characteristic value calculation sub-module is configured to respectively extract associated data of the two groups of test products within a certain time period from the historical transaction data and calculate a characteristic value of each primitive characteristic of the two groups of test products using the associated data. The comparison sub-module is configured to compare characteristic values of the same primitive characteristic of the two groups of test products. If a difference value thereof exceeds a threshold value, the server may select the primitive characteristic as an effective characteristic.

The effective characteristic weight determination module 512 is configured to determine an initial weight of each of the effective characteristics based on the historical transaction data, and train the initial weight using the historical transaction data and a predetermined training model to obtain a final weight.

The ranking module 514 is configured to rank the search results based on the final weight of the effective characteristic.

In some embodiments, as shown in FIG. 6, the memory 508 may include a candidate weight value acquisition module 602, a theoretical ranking score calculation module 604, a transaction data acquisition module 606, an actual ranking score calculation module 608 and a final weight determination module 610.

The candidate weight value acquisition module 602 is configured to respectively acquire each group of candidate weight values of effective characteristics of search results.

The theoretical ranking score calculation module 604 is configured to calculate theoretical ranking scores of search results at a certain predetermined time point respectively using each of the candidate weight values, and rank the search results based on the theoretical ranking scores to obtain each group of ranking results.

The transaction data acquisition module 606 is configured to respectively acquire a predetermined number of search results ranked higher in each group of ranking results, and acquire transaction data of the search results after the predetermined time point.

The actual ranking score calculation module 608 is configured to calculate actual ranking scores of a predetermined number of search results ranked higher in each group of ranking results based on the transaction data.

The final weight determination module 610 is configured to select candidate weight values corresponding to a group of ranking results with the highest actual ranking score as final weight values of the effective characteristics.

In some embodiments, as shown in FIG. 7, the memory 508 may include a theoretical ranking score calculation module 702, an actual ranking score calculation module 704 and an optimization module 706.

The theoretical ranking score calculation module 702 is configured to acquire ranking results at a certain predetermined time point ranked based on theoretical ranking scores of search results, wherein the theoretical ranking score may be obtained based on a final weight of an effective characteristic and an actual effective characteristic value of each of the search results.

The actual ranking score calculation module 704 is configured to acquire transaction data of a predetermined number of search results ranked higher in the ranking results after the predetermined time point and to calculate actual ranking scores of the search results based on the transaction data.

The optimization module 706 is configured to compare the actual ranking score with the theoretical ranking score. If a difference value thereof exceeds a threshold value, the optimization module 706 may optimize the final weight of the effective characteristic.

Various embodiments of the specification are described in a progressive way, and each of the embodiments focuses on the differences from other embodiments. Thus, the same and similar parts among various embodiments may be referred to each other.

Various embodiments are described herein to explain the present disclosure, and the description of the above embodiments is only used for the purpose of assisting in understanding the present disclosure. Meanwhile, those of ordinary skill in the art may make changes in terms of particular embodiments and application scopes based on the ideas of the present disclosure. In summary, the contents of the specification may not be interpreted as limiting the present disclosure.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method of ranking search results, the method comprising:
   acquiring, by a server, multiple primitive characteristics that include multiple preset characteristics having influence on search result ranking, the primitive characteristics being based on historical transaction data;
   extracting multiple effective characteristics from the multiple primitive characteristics based on historical transaction data, the extracting multiple effective characteristics comprising:
      extracting transaction data within a predetermined time period from the historical transaction data,
      calculating a deal conversion rate of individual products within the predetermined time period; and
      selecting an effective characteristic based on the deal conversion rate;
   determining an initial weight of an individual characteristic of the multiple effective characteristics based on the historical transaction data;
   training the initial weight using the historical transaction data and a predetermined training model to obtain a final weight; and
   ranking search results based on the final weight.

2. The method of claim 1, wherein the extracting the multiple effective characteristics from the multiple primitive characteristics based on the historical transaction data comprises:
   selecting a first group of test products based on historical transaction data, the first group of test products having deal records;
   selecting a second group of test products based on the historical transaction data, the second group of test products not having deal records;
   extracting associated transaction data of the first group of test products and the second group of test products respectively within a predetermined time period from the historical transaction data;
   selecting an effective characteristic based on a comparison between the associated transaction data of the first group of test products and the associated transaction data of the second group of test products.

3. The method of claim 2, wherein the selecting the effective characteristic based on the comparison between the associated transaction data of the first group of test products and the associated transaction data of the second group of test products comprises:
   calculating, using the associated data, a first characteristic value of an individual characteristic of multiple primitive characteristics of the first group of test products;
   calculating, using the associated data, a second characteristic value of an individual characteristic of multiple primitive characteristics of the second group of test products;
   determining a difference between the first characteristic value and second characteristic value; and
   selecting, in response to a determination that the difference is greater than a predetermined value, the individual characteristic as an effective characteristic.

4. The method of claim 1, wherein the selecting the effective characteristic based on the deal conversion rate comprises:
   selecting a first group of test products and a second test group of products, a difference of deal conversion rates of the first group of test products and the second group of test products being greater than a predetermined value;
   extracting, from the historical transaction data, transaction data of the first groups of test products and the second groups of test products within a certain time period after the predetermined time period;
   calculating, using the transaction data, a first characteristic value of an individual characteristic of multiple primitive characteristics of the first group of test products;
   calculating, using the transaction data, a second characteristic value of an individual characteristic of multiple primitive characteristics of the second group of test products;
   determining a difference between the first characteristic value and second characteristic value; and
   selecting, in response to a determination that the difference is greater than a predetermined value, the individual characteristic as an effective characteristic.

5. The method of claim 1, wherein the determining the initial weight of the individual characteristic of the multiple effective characteristics based on the historical transaction data and the training the initial weight using the historical transaction data and the predetermined training model to obtain the final weight comprise:
   determining an initial weight of an effective characteristic;
   substituting the historical transaction data and the initial weight into the predetermined training model to calculate theoretical data;
   determining a difference between the theoretical data with actual data; and
   determining, in response to a determination that the difference is less than a predetermined value, that the initial weight is a final weight of the effective characteristic.

6. The method of claim 1, wherein the ranking the search results based on the final weight comprises:
   determining actual effective characteristic values of the search results;
   calculating predicted deal conversion rates of the search results based on the final weight of the effective characteristic and the actual effective characteristic values; and
   ranking the search results based on the predicted deal conversion rates.

7. One or more computer-readable media storing computer-executable instructions that, when executed by one or more processors, instruct the one or more processors to perform acts comprising:
   acquiring candidate weight values of effective characteristics of multiple search results, the candidate weight values being divided into multiple groups;
   calculating theoretical ranking scores of search results at a predetermined time point using the candidate weight values;
   ranking the search results based on the theoretical ranking scores to obtain multiple groups of ranking results;
   acquiring a predetermined number of search results in an individual group of the multiple groups of ranking results;
   acquiring transaction data of the search results after the predetermined time point;
   calculating actual ranking scores of the predetermined number of search results in the individual group of the multiple groups of ranking results based on the transaction data; and
   selecting candidate weight values corresponding to a group of ranking results that have an actual ranking score greater than a predetermined value as final weight values of the effective characteristics.

8. The one or more computer-readable media of claim 7, wherein the theoretical ranking score is a predicted value of a single characteristic or a predicted value of a combination of characteristics, and the actual ranking score is an actual value of a single characteristic or an actual value of a combination of characteristics that is corresponding to the theoretical ranking score.

9. The one or more computer-readable media of claim 8, wherein the theoretical ranking score is a predicted deal conversion rate, and the actual ranking score is an actual deal conversion rate.

10. The one or more computer-readable media of claim 8, wherein the theoretical ranking score is a predicted positive feedback rate, and the actual ranking score is an actual positive feedback rate.

11. The one or more computer-readable media of claim 7, wherein the actual ranking score is a highest sum or average value of actual ranking scores.

12. A method of ranking search results, the method comprising:
   acquiring, by a server at a predetermined time point, ranking results ranked based on theoretical ranking scores of multiple search results, the theoretical ranking score being obtained based on a final weight of an effective characteristic and an actual effective characteristic value of each of the search results;
   acquiring transaction data of a predetermined number of search results of the multiple search results after the predetermined time point, the predetermined number of search results being ranked higher than other search results of the multiple search results;
   calculating actual ranking scores of the search results based on the transaction data;
   determining a difference between the actual ranking score and the theoretical ranking score; and
   optimizing, in response to a determination that the difference exceeds a threshold value, the final weight of the effective characteristic.

13. The method of claim 12, wherein the theoretical ranking score is a predicted deal conversion rate, and the actual ranking score is an actual deal conversion rate.

14. The method of claim 12, wherein the theoretical ranking score is a predicted positive feedback rate, and the actual ranking score is an actual positive feedback rate.

15. A system of ranking search results, the system comprising:
   one or more processors; and
   a memory device to maintain a plurality of components executable by the one or more processors, the plurality of components comprising:
   a primitive characteristic set acquisition module configured to acquire multiple primitive characteristics that include multiple preset characteristics having influence on search result ranking, the primitive characteristics being based on historical transaction data,
   an effective characteristic extraction module configured to extract multiple effective characteristics from the multiple primitive characteristics based on historical transaction data, the extracting multiple effective characteristics comprising:
   extracting transaction data within a predetermined time period from the historical transaction data,
   calculating a deal conversion rate of individual products within the predetermined time period; and
   selecting an effective characteristic based on the deal conversion rate, an effective characteristic weight determination module configured to:
      determine an initial weight of an individual characteristic of the multiple effective characteristics based on the historical transaction data, and
      train the initial weight using the historical transaction data and a predetermined training model to obtain a final weight, and
   a ranking module configured to rank search results based on the final weight.

16. The system of claim 15, wherein the effective characteristic extraction module comprises:
   a test product selection sub-module configured to:
      select a first group of test products based on historical transaction data, the first group of test products having deal records, and
      select a second group of test products based on the historical transaction data, the second group of test products not having deal records;
   a characteristic value calculation sub-module configured to extract associated transaction data of the first group of test products and the second group of test products within a predetermined time period from the historical transaction data; and
   a comparison sub-module configured to select an effective characteristic based on a comparison between the associated transaction data of the first group of test products and the associated transaction data of the second group of test products.

17. The system of claim 15, wherein the determining the initial weight of the individual characteristic of the multiple effective characteristics based on the historical transaction data and the training the initial weight using the historical transaction data and the predetermined training model to obtain the final weight comprise:
   determining an initial weight of an effective characteristic;
   substituting the historical transaction data and the initial weight into the predetermined training model to calculate theoretical data;
   determining a difference between the theoretical data with actual data; and
   determining, in response to a determination that the difference is less than a predetermined value, that the initial weight is a final weight of the effective characteristic.

18. The system of claim 15, wherein the ranking the search results based on the final weight comprises:
   determining actual effective characteristic values of the search results;
   calculating predicted deal conversion rates of the search results based on the final weight of the effective characteristic and the actual effective characteristic values; and
   ranking the search results based on the predicted deal conversion rates.

* * * * *